United States Patent [19]

Brow et al.

[11] Patent Number: 5,104,738

[45] Date of Patent: Apr. 14, 1992

[54] SEALING GLASSES FOR TITANIUM AND TITANIUM ALLOYS

[75] Inventors: Richard K. Brow; Randall D. Watkins, both of Albuquerque, N. Mex.

[73] Assignee: The United States of America as represented by the United States Department of Energy, Washington, D.C.

[21] Appl. No.: 146,507

[22] Filed: Jun. 1, 1988

[51] Int. Cl.$^5$ ................. B32B 15/04; C03C 27/02
[52] U.S. Cl. ................. 428/433; 428/432; 501/15; 501/52
[58] Field of Search ............ 501/15, 52; 428/432, 428/433

[56] References Cited

U.S. PATENT DOCUMENTS

| | | | |
|---|---|---|---|
| 2,090,098 | 8/1937 | Berger et al. | 106/36.1 |
| 2,393,449 | 1/1946 | Armistead | 106/54 |
| 2,899,584 | 8/1959 | Verwey | 313/112 |
| 3,598,620 | 8/1971 | Akhtar | 106/54 |
| 4,291,107 | 9/1981 | Barry et al. | 429/104 |
| 4,341,849 | 7/1982 | Park et al. | 501/52 |
| 4,556,613 | 12/1985 | Taylor et al. | 429/101 |

FOREIGN PATENT DOCUMENTS 708698 5/1954 United Kingdom.
2056753A 3/1981 United Kingdom.

OTHER PUBLICATIONS

Rawson and Denton, "The Glass Sealing Properties of Titanium and Zirconium", *British Journal of Applied Physics*, vol. 5, Oct. 1954, pp. 352–353.

McColm, I. & Dimby Low, C., "Wetting of Refractory Titanium Hard Metals by Sodium Disilicate Glass", *Journal of Materials Science*, vol. 9, pp. 1320–1324, 1974.

Kohl, W., "Glass-To-Metal Sealing", *Handbook of Materials and Techniques for Vacuum Devices*, Reinhold Publishing Corporation, May 3, 1977, pp. 415–416.

Passerone, A., Valbusa, G., & Biagini, E., "The Titanium-Molten Glass System: Interactions and Wetting", *Journal of Materials Science*, vol. 12, pp. 2465–2474, 1977.

Brillson, L., Slade, M. & Richter, H., "Titanium–Silicon and Silicon Dioxide Reactions Controlled by Low Temperature Rapid Thermal Annealing", *J. Vacuum Science Technology A.*, vol. 4, No. 3, May/Jun. 1986, pp. 993–997.

Kimble Glass, "Sealing Glasses and Other Materials", *Owens Illinois Technical Data Book*.

*Primary Examiner*—William R. Dixon, Jr.
*Assistant Examiner*—Anthony J. Green
*Attorney, Agent, or Firm*—Anne D. Daniel; James H. Chafin; William R. Moser

[57] ABSTRACT

Glass compositions containing CaO, $Al_2O_3$, $B_2O_3$, SrO and BaO of various combinations of mole % are provided. These compositions are capable of forming stable glass-to-metal seals with titanium and titanium alloys, for use in components such as seals for battery headers.

8 Claims, No Drawings

SEALING GLASSES FOR TITANIUM AND TITANIUM ALLOYS

The U.S. Government has rights in this invention pursuant to Contract No. DE-AC04-76DP00789 between the U.S. Department of Energy and AT&T Technologies, Inc.

BACKGROUND OF THE INVENTION

This invention relates to glass-to-metal seals and, more particularly, to glass compositions that form hermetic seals with titanium and titanium alloys. These seals can be used in components requiring the use of titanium housings or feedthroughs, e.g. in seals for battery headers. Titanium and titanium alloys have a number of desirable properties, including a high strength-to-weight ratio, high resistance to chemical attack, and moderate high temperature stability. The availability of pure titanium and titanium alloys in both quantity and shape or form has increased over recent years, making its use more attractive and feasible.

In order to form an acceptable hermetic seal with titanium, the glass must meet three main criteria. First, the glass must have a coefficient of thermal expansion (CTE) that matches titanium over the range from room temperature to the glass transition temperature. The second criterion is that the glass must be chemically compatible with the titanium. Titanium is a very reactive metal at high temperature, and reactions between titanium and molten oxide glasses are generally thermodynamically favorable. If the reaction generates gaseous species at the interface, hermeticity and mechanical integrity are difficult to retain. The final requirement is that the glass must be able to seal to titanium at temperatures below 882° C. At this temperature, titanium exhibits an allotropic phase transformation that is not fully reversible upon cooling. This results in changes in thermal properties and degradation of low temperature mechanical properties.

Up to now, titanium and titanium alloys could not be used in components requiring glass-to-metal seals. Conventional alkali silicate sealing glasses with the required matching coefficients of thermal expansion can react with titanium at the seal temperature to form bubbles at the glass-metal interfaces, thus degrading the seal performance. Alkali volatilization has been reported in seals between titanium and alkali silicate glasses (I. J. McColm, C. Dimby Low, *Journal of Materials Science*, Vol. 9, pp. 1320–1324 (1974)). In addition, Ti silicide formation has been observed (A. Passerone, G. Valbusa, E. Biagini, *Journal of Materials Science*, Vol. 12, pp. 2465–2474 (1977)) and characterized to have poor adherence with the glass. Finally, these glasses require high sealing temperatures that cause the titanium phase transition that can affect detrimentally some of its advantageous mechanical properties.

Although the possibility of creating glasses for sealing to titanium has been previously discussed in the relevant literature, the required technology has not been available in the past. Rawson and Denton described the properties of titanium sealing glasses in 1954 (H. Rawson, E. P. Denton, *British Journal of Applied Physics*, Vol. 5, pp. 352–353 (1954)). The CTE's of their glasses matched titanium, but high sealing temperatures (900°–1000° C.) were required. Also, those glasses contain alkali oxides and silica, species that are unstable with respect to titanium at high temperatures. Therefore, very short sealing times were required to prevent appreciable reaction of the glass with titanium, and to minimize the extent of the titanium phase transformation.

Kimble glass literature (Kimble Glass/Owens Illinois Technical Data Book) recommends several glasses for sealing to titanium, based only on thermal expansion capability however. KG-12 is an alkali-lead-silicate glass requiring temperatures of 900°–1000° C. for sealing. TM-9 is a commercial alkali-barium-silicate glass that also requires temperatures above 950° C. for sealing. EG-6 is similar to KG-12. The use of any of these glasses will promote the titanium phase transformation as well as the deleterious reduction of alkali oxides and the formation of deleterious interfacial titanium silicides. Thus, there is no previously established technology that describes hermetic sealing to titanium that meets the above-described criteria.

There is an existing need for the development of such technology to allow the use of titanium and titanium alloys in explosive and pyrotechnic components requiring hermetic seals, in components requiring high strength pins or casings, and in components susceptible to corrosion.

Also, there is an existing need for the development of titanium sealing glasses for wide commercial applications in biomedical implant devices, such as pacemaker batteries, where the outstanding corrosion resistance of the titanium would be of prime importance.

SUMMARY OF THE INVENTION

In view of the above-described needs, it is an object of this invention to provide glass compositions that form hermetic seals with titanium and titanium alloys.

It is a further object of this invention to provide glass compositions that are stable, that have coefficients of thermal expansion that match titanium and titanium alloys, and that seal at low temperatures, for use in glass-to-metal seals where titanium is the metal.

It is still a further object of this invention to provide glass compositions for sealing to titanium and titanium alloys that produce no gas phase reaction products during seal processing, and that produce solid phase reaction products enhancing the adherence between the glass and the metal.

To achieve the foregoing and other objects and in accordance with the purpose of the present invention, as embodied and broadly described herein, there have now been devised new alkaline earth-aluminoborate ternary or quaternary glass formulations, containing CaO, $Al_2O_3$, $B_2O_3$, SrO, and BaO, in various combinations. Thermal expansion coefficients of specific glass compositions range from 90-104E-7/° C., which corresponds to typical thermal expansion coefficients of titanium (Ti grade 2 is 97.1E-7/° C., 25°–700° C., and Ti beta C alloy is 99.5E-7/° C, 25°–700° C.). These glasses flow and seal to titanium at low temperatures, i.e. 670°–750° C., which is well below the Ti phase transformation temperature of 882° C. Also, these glasses are alkali-free, and no gas phase reaction products are observed following seal processing. Finally, the glasses are free of silicon; therefore, the potential for silicide formation does not exist with these glasses. Thus, the new glasses have the proper composition and thermal expansion, viscosity, and sealing temperature characteristics for creating glass-to-titanium metal seals without the formation of bubbles or porosity.

Additional objects, advantages, and novel features of the invention will become apparent to those skilled in the art upon examination of the following description or may be learned by the practice of the invention. The objects and advantages of the invention may be realized and attained by means of the instrumentalities and combinations particularly pointed out in the appended claims.

DETAILED DESCRIPTION OF THE INVENTION

In the glasses of the invention, preferred compositions are three alkaline earth-aluminoborate ternary systems and one quaternary mixed alkaline earth-aluminoborate system, as follows:

| Oxide | Range (mole %) |
| --- | --- |
| CaO | 45–55 |
| $Al_2O_3$ | 10–20 |
| $B_2O_3$ | 25–35 |
| SrO | 40–50 |
| $Al_2O_3$ | 10–20 |
| $B_2O_3$ | 30–50 |
| BaO | 30–60 |
| $Al_2O_3$ | 10–30 |
| $B_2O_3$ | 30–50 |
| CaO | 20–40 |
| BaO | 10–30 |
| $Al_2O_3$ | 5–15 |
| $B_2O_3$ | 30–50 |

These compositions were found to produce glasses with the proper thermal expansion and viscosity characteristics for sealing to titanium. The optimum composition for each system appears below, along with its corresponding coefficient of thermal expansion and glass transition temperature (Tphd g):

| Name | Oxide | Optimum (Mole %) | CTE | $T_g$ |
| --- | --- | --- | --- | --- |
| CABAL-17 | CaO | 50 | 91E-7/°C. | 592° C. |
|  | $Al_2O_3$ | 20 |  |  |
|  | $B_2O_3$ | 30 |  |  |
| SrBAL-1 | SrO | 45 | 98E-7/°C. | 570° C. |
|  | $Al_2O_3$ | 15 |  |  |
|  | $B_2O_3$ | 40 |  |  |
| BABAL-2 | BaO | 40 | 104E-7/°C. | 542° C. |
|  | $Al_2O_3$ | 20 |  |  |
|  | $B_2O_3$ | 40 |  |  |
| BABAL-1C | CaO | 30 | 101E-7/°C. | 558° C. |
|  | BaO | 20 |  |  |
|  | $Al_2O_3$ | 10 |  |  |
|  | $B_2O_3$ | 40 |  |  |

The glasses of this invention may be prepared using fully conventional melting and forming techniques normally employed for glasses of this type. For example, the glasses listed above were melted at 1300°–1400° C. for 5 hours in air and cast in preheated molds. Samples were annealed near the glass transition temperature ($T_g$) as determined by differential thermal analysis (DTA). Glass-to-metal seals using titanium and the glass compositions of the present invention can be fabricated in a conventional manner in either a continuous belt or batch furnace.

A preferred use for the glasses of this invention is in seal fabrication as described above. A particularly preferred use is the formation of hermetic glass-to-metal seals where the metal is titanium or a titanium alloy.

Without further elaboration, the following preferred specific embodiments are provided to illustrate some of the properties of the glasses of the invention and to allow one skilled in the art to utilize the present invention to its fullest extent. Therefore, these examples are to be construed as merely illustrative, and not limitative of the remainder of the disclosure in any way whatsoever.

EXAMPLES OF SEAL FABRICATION

Glasses meeting the formability and thermal expansion requirements for sealing to titanium, such as those described above, were selected for evaluation. In addition, one commercial glass, Kimble TM-9, was chosen for comparison to illustrate the unexpectedly marked improvement of the glasses of the invention over the prior art, and to demostrate the beneficial results of the use of the glasses of the invention for sealing to titanium, in comparison to the results of using conventional glasses for titanium sealing.

The seal configuration employed consisted of a cylindrical metal shell (approximately 0.250" internal diameter (I.D.)) isolated from a straight pin (0.125" diameter) by the sealing glass. Material combinations included first, Ti-beta C alloy shell with a titanium pin, second, Ti-beta C shell with a Ti-beta C pin, and, third, 304 stainless steel shell with Ti-beta C or titanium pins.

The following table summarizes the optimum conditions under which each glass was sealed.

TABLE 1

| Glass | Sealing Temperature (degrees C.) | Sealing Time (Min.) | Atmosphere | Furnace |
| --- | --- | --- | --- | --- |
| 50CaO/20$Al_2O_3$/ | 750 | 10 | Ar | Batch |
| 30$B_2O_3$ | 750 | 10 | $N_2$ | Belt |
| 45SrO/15$Al_2O_3$/ | 690 | 10 | $N_2$ | Belt |
| 40$B_2O_3$ |  |  |  |  |
| 40BaO/20$Al_2O_3$/ | 650 | 10 | $N_2$ | Belt |
| 40$B_2O_3$ |  |  |  |  |
| 30CaO/20BaO/ | 670 | 10 | Ar | Batch |
| 10$Al_2O_3$/ | 670 | 10 | $N_2$ | Belt |
| 40$B_2O_3$ |  |  |  |  |
| TM-9(Kimble, | 950 | 30 | Ar | Batch |
| alkali-silicate) | 950 | 15 | $N_2$ | Belt |

Seals were evaluated for hermeticity by helium leak detection. Seals were observed visually by low power optical microscopy to evaluate glass flow and to detect major defects, such as large bubbles or cracks. In addition, electron microscopy was done to evaluate the glass-metal interface. Finally, the mechanical integrity of seals was evaluated by pin pull tests. In these tests, Ti pins were pulled out of glass seals at a controlled rate. The maximum load (in lbs.) is recorded from a load/deflection curve. The results are a semi-quantitative measure of glass-metal adherence. Hermeticity, defined as a leak rate less than 1E-9 std cc He/sec at room temperature (which is the detectability limit for the apparatus used), was achieved in seals for every system of the new glasses examined.

The general appearance of each of the new aluminoborate glass seals was similar. Proper glass flow was observed when sealing was accomplished under the above-described conditions, no bubbles or cracks were observed, and the glass retained transparency. In comparison, Kimble TM-9, the standard commercial glass, exhibited occasional bubble formation at the titanium/glass interface that was observed by transmitted light microscopy at 10x.

The morphology of the glass-metal interface was examined by scanning electron microscopy. The reaction between a representative $CaO/BaO/A_2O_3/B_2O_3$ glass and titanum produced gas phase porosity, while such porosity was observed with TM-9. Because of this porosity, the mechanical integrity of the TM-9 seal was doubtful. The results from the pin pull studies, confirm the poor adherence of the silicate/Ti seals relative to our new aluminoborate/Ti seals. Without exception, aluminoborate/Ti seals were 50–100% stronger than Tm9/Ti seals. It should be noted that the porosity shown in the TM-9 sample was predictable due to the high alkali content (at 14 weight %) and the high temperature required. As described earlier, when glass-to-metal seals are created using titanium or its alloys as the metal, the metal's mechanical properties degrade and its thermal properties vary following heat treatment above the transition temperature of 882° C. The new aluminoborate glasses require temperatures well below this transition point, as described and shown herein.

From the foregoing description, one skilled in the art can easily ascertain the essential characteristics of this invention, and, without departing from the spirit and scope thereof, can make various changes and modifications of the invention to adapt it to various usages and conditions.

We claim:

1. A glass-to-metal seal, consisting essentially of:
   (a) a metal selected from the group consisting of titanium or titanium alloys, in contact with
   (b) an alkali-free, silica-free glass consisting essentially of, in mole %;

| | |
|---|---|
| CaO | about 45-55 |
| $Al_2O_3$ | about 10-20 |
| $B_2O_3$ | about 25-35. |

2. A glass-to-metal seal, according to claim 1, consisting essentially of:
   (a) a metal selected from the group consisting of titanium or titanium alloys, in contact with
   (b) an alkali-free, silica-free glass consisting essentially of, in mole %:

| | |
|---|---|
| CaO | about 50 |
| $Al_2O_3$ | about 20 |
| $B_2O_3$ | about 30. |

3. A glass-to-metal seal, consisting essentially of:
   (a) a metal selected from the group consisting essentially of, in mole %:

| | |
|---|---|
| SrO | about 40-50 |
| $Al_2O_3$ | about 10-20 |
| $B_2O_3$ | about 30-50. |

4. A glass-to-metal seal, according to claim 3, consisting essentially of:
   (a) a metal selected from the group consisting of titanium or titanium alloys, in contact with
   (b) an alkali-free, silica-free glass consisting essentially of, in mole %:

| | |
|---|---|
| SrO | about 45 |
| $Al_2O_3$ | about 15 |
| $B_2O_3$ | about 40. |

5. A glass-to-metal seal, consisting essentially of:
   (a) a metal selected from the group consisting of titanium or titanium alloys, in contact with
   (b) an alkali-free, silica-free glass consisting essentially of, in mole %:

| | |
|---|---|
| BaO | about 30-60 |
| $Al_2O_3$ | about 10-30 |
| $B_2O_3$ | about 30-50. |

6. A glass-to-metal seal, according to claim 5, consisting essentially of:
   (a) a metal selected from the group consisting of titanium or titanium alloys, in contact with
   (b) an alkali-free, silcia-free glass consisting essentially of, in mole %:

| | |
|---|---|
| BaO | about 40 |
| $Al_2O_3$ | about 20 |
| $B_2O_3$ | about 40. |

7. A glass-to-metal seal, consisting essentially of:
   (a) a metal selected from the group consisting of titanium or titanium alloys, in contact with
   (b) an alkali-free, silica-free glass consisting essentially of, in mole %:

| | |
|---|---|
| CaO | about 20-40 |
| BaO | about 10-30 |
| $Al_2O_3$ | about 5-15 |
| $B_2O_3$ | about 30-50. |

8. A glass-to-metal seal, according to claim 7, consisting essentially of:
   (a) a metal selected from the group consisting of titanium or titanium alloys, in contact with
   (b) an alkali-free, silica-free glass consisting essentially of, in mole %:

| | |
|---|---|
| CaO | about 30 |
| BaO | about 20 |
| $Al_2O_3$ | about 10 |
| $B_2O_3$ | about 40. |

* * * * *